Dec. 6, 1949     A. E. WILDE, JR     2,490,330
AIRCRAFT ANTENNA SYSTEM
Filed June 26, 1944     2 Sheets-Sheet 1
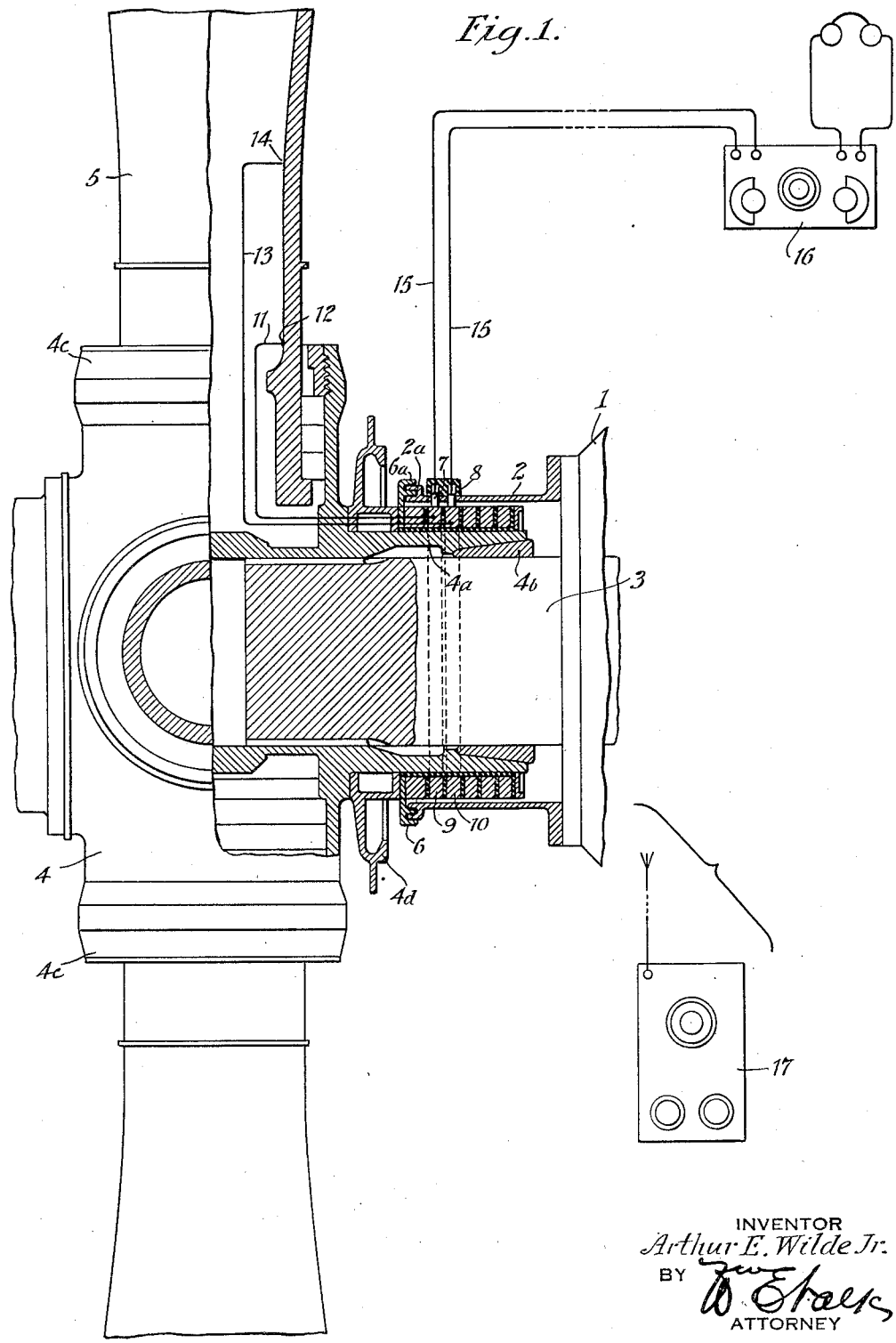
INVENTOR
*Arthur E. Wilde Jr.*
BY
ATTORNEY Dec. 6, 1949     A. E. WILDE, JR     2,490,330
AIRCRAFT ANTENNA SYSTEM
Filed June 26, 1944     2 Sheets-Sheet 2
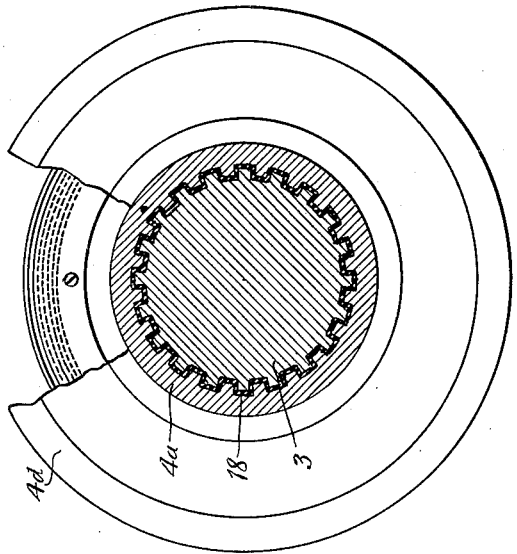
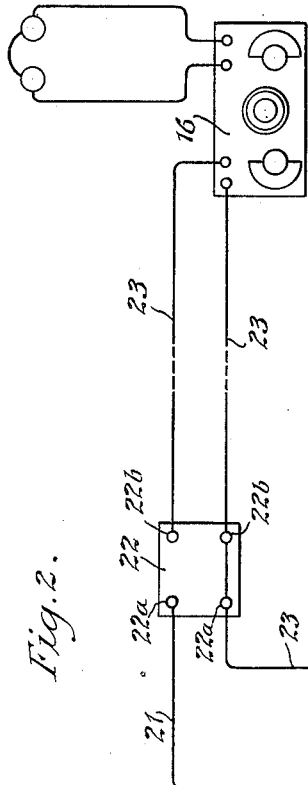
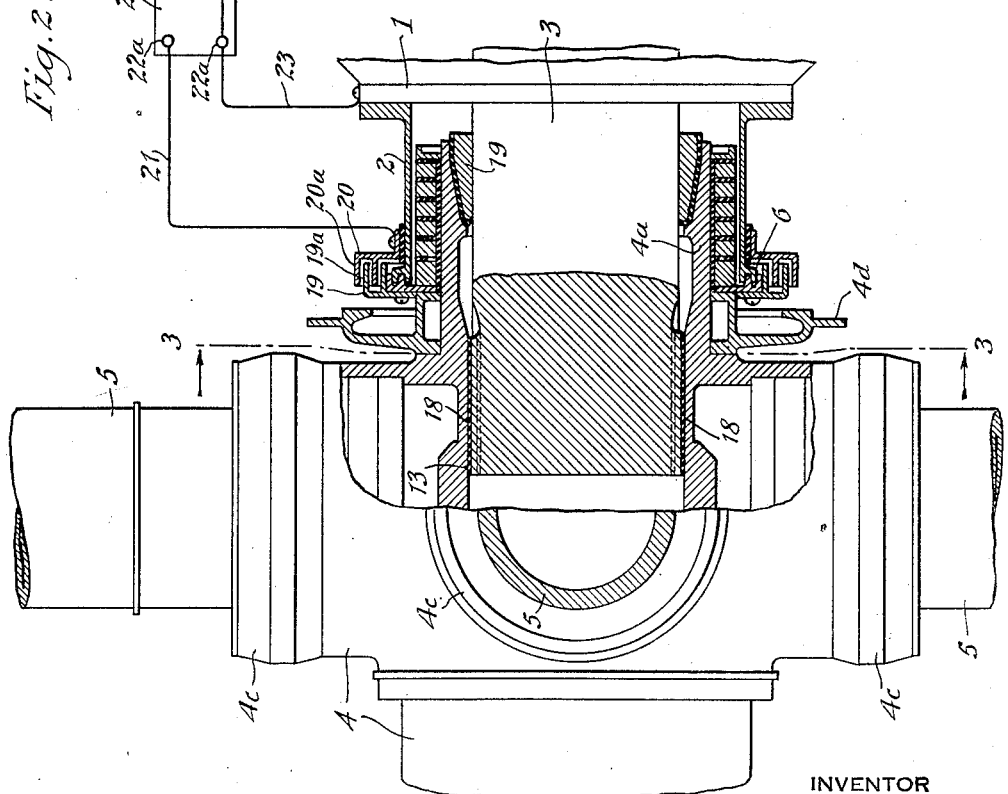
INVENTOR
*Arthur E. Wilde Jr.*
BY
*[signature]*
ATTORNEY Patented Dec. 6, 1949

2,490,330

UNITED STATES PATENT OFFICE 2,490,330

AIRCRAFT ANTENNA SYSTEM

Arthur E. Wilde, Jr., West Caldwell, N. J., assignor to Curtiss-Wright Corporation, a corporation of Delaware Application June 26, 1944, Serial No. 542,032

10 Claims. (Cl. 250—33)

My invention relates to an aircraft antenna system and more particularly to the use of an aircraft propeller as a radio antenna.

My invention relates to means for coupling the aircraft radio apparatus to the aircraft propeller in such fashion that radio-frequency energy is picked up by said propeller and conducted therefrom to the aircraft receiving apparatus. My invention also involves the conduction of radio-frequency energy from the aircraft transmission apparatus to said aircraft propeller with resultant radiation of radio-frequency energy therefrom.

An object of my invention is to obviate the necessity of using a trailing or fixed antenna secured to the airplane frame. A further object is to provide a simple low cost antenna system for an aircraft which is operable over a wide range of frequencies.

Various other objects, advantages and features of my invention will become apparent from the following detailed description.

For an understanding of my invention and for an illustration of one of the forms thereof, reference is to be had to the accompanying drawings, in which:

Figure 1 is a front elevational view, partially in section, of an aircraft radio system constructed in accordance with the invention;

Fig. 2 is a front elevational view, partially in section, of a modification of my invention; and Fig. 3 is a sectional view taken on the line 3—3 of Fig. 2 looking in the direction of the arrows.

Referring now to Fig. 1, the nose 1 of an aircraft has secured thereto a cylindrical forwardly-extending brush housing 2 through which extends a propeller shaft 3 rotatable by a suitable aircraft engine, not shown. Splined to the propeller shaft 3 is a tubular section 4a of a propeller hub 4 which is secured against longitudinal motion relative to the shaft 3 by a rear locking cone 4b and a front locking cone, not shown. The hub 4 is provided with sockets 4c in which the respective propeller blades 5 are journalled for pitch-changing purposes, as well understood in the art.

The tubular section 4a has a circumferential slinger ring 4d which abuts a circular seal ring 6 having flanges 6a which form a fluid tight joint with complementary flanges 2a of the brush housing 2. Suitably secured to the brush housing 2 are brushes 7 and 8 which are co-actable with slip rings 9 and 10, respectively, mounted on the tubular section 4a. Extending from the slip ring 9 is a conductor 11 which extends interiorly of the hub 4 and is tapped at 12 to an interior surface of one of the propeller blades 5. In similar fashion, a conductor 13 is connected to the slip ring 8 and passes through the hub 4 to a tap 14 radially aligned with respect to the tap 12. Extending from the brushes 7, 8 is a transmission line 15, 15 which passes to the antenna terminals of the aircraft radio apparatus, schematically indicated at 16.

With the aircraft in flight, radio-frequency energy emanating from a transmitter 17 is picked up by the propeller blade 5, passing therefrom through the conductors 11 and 13, slip rings 9 and 10, brushes 7 and 8, and transmission line 15, 15 to the antenna circuit of the radio apparatus 16. In this manner, I provide means for utilizing the propeller blade 5 as a radio antenna, obviating the necessity for providing a trailing or fixed antenna attached to the airplane frame.

Quite commonly, the same radio system is used for both transmission and reception of radio messages in which case the disclosed system is utilized for both a transmitting and receiving antenna. However, if a separate transmitter is used, I provide switching means for connecting the transmission line 15, 15 to either the transmitter or receiver, as desired.

For best results, the distance between the tap 12 and the tip of the propeller blade 5 should be ¼ wavelength or a fractional multiple thereof, such as ¾ wavelength. It is apparent that by suitably adjusting the position of the tap 12, the radio apparatus is operable over a wide range of frequencies at which the antenna is substantially resonant. Further, the distance between tap 12 and tap 14 should be carefully selected in order that the electrical impedance of the propeller blade together with its associated conductors and transmission line is substantially equal to the impedance of the antenna circuit of the radio apparatus 16.

It will be understood that many changes may be made in the application of my invention as disclosed above. One such modification is illustrated in Figs. 2 and 3 in which structure similar to that of Fig. 1 is denoted by like reference characters. In this modification, means are provided for electrically insulating the hub 4 from the propeller shaft 3. Such insulating means may comprise a layer of insulating material such as Micarta shown at 18, Figs. 2 and 3, which is interposed between the propeller shaft 3 and the hub 4, this insulating material being fitted around the splined portion of the propeller shaft 3. Moreover, the rear locking cone 19 and the front locking cone, not shown, are either formed from suitable insulating material or have a layer of insulating material, as Micarta, bonded thereto.

In this embodiment, I prefer to replace the slip rings 9, 10 and the brushes 7, 8 of Fig. 1, by a capacitative coupling between the transmission line and the propeller hub. This coupling comprises a circular member 19 having longitudinally extending flanges 19a, this circular member being electrically connected to the propeller hub and rigidly secured thereto. The brush housing 2 carries a circular member 20 insulated therefrom which is provided with longitudinally extending flanges 20a complementary with and spaced from the aforesaid flanges 19a. It is to be understood that the described coupling arrangement is interchangeable with the brush and slip ring of Fig. 1.

Extending from the circular member 20 is a conductor 21 which passes to one of a set of terminals 22a, 22a of an impedance matching device 22, the other terminal 22a of the set being connected to the airplane frame by a conductor 23. Another set of terminals 22b, 22b of the impedance matching device 22 are connected by a transmission line 23, 23 to the antenna terminals of the aircraft radio apparatus 16. The impedance matching device 22 may comprise inductance, resistance, capacitance or any desired combination thereof to the end that the impedance of the propeller together with the conductors and transmission line associated therewith is substantially equal to the impedance of the aforesaid antenna circuit of the radio apparatus 16. With this construction, the propeller acts as a radio antenna insulated from the propeller shaft 3. With this arrangement the radio-frequency energy is picked up by the propeller structure and is transmitted therefrom through the flanges 19a and 20a, conductor 21, impedance matching device 22, and transmission line 23 to the aircraft radio apparatus. This embodiment is also operable over a wide range of frequencies and is highly flexible as regards impedance because of the use of the impedance matching device 22.

I have thus provided simple and inexpensive means for replacing the cumbersome aircraft antenna systems of the prior art by a system in which the propeller is efficiently utilized as an antenna over a wide range of frequencies.

While the invention has been described with respect to certain particular preferred examples which give satisfactory results, it will be understood by those skilled in the art after understanding the invention, that various changes and modifications may be made without departing from the spirit and scope of the invention, and it is intended therefore in the appended claims to cover all such changes and modifications.

What is claimed as new and desired to be secured by Letters Patent, is:

1. The combination with an aircraft having a continuously rotating propeller, of radio apparatus carried by said aircraft, and means connected to said propeller and said radio apparatus, said means forming a path for radio-frequency energy including means for transferring energy from a stationary part to the rotating propeller, said propeller serving as a driven radio antenna for said apparatus.

2. The combination with an aircraft having a continuously rotating propeller, of radio apparatus carried by said aircraft, means connected to said propeller and said radio apparatus, said means forming a path for radio-frequency energy and including means for transferring energy from a stationary part to the rotating propeller, said propeller serving as a driven radio antenna for said apparatus, and means for electrically insulating said propeller from said aircraft.

3. The combination with an aircraft having a continuously rotating propeller, of radio apparatus carried by said aircraft, means connected to said propeller and said radio apparatus, said means including a transmission line connected to said radio apparatus and including means for transferring energy from a stationary part to the rotating propeller, and means for selecting a desired electrical impedance of said propeller, said propeller serving as a driven antenna for said apparatus.

4. The combination with an aircraft having a continuously rotatable propeller, of radio apparatus carried by said aircraft, means connected to said propeller and said radio apparatus, said means including a transmission line connected to said radio apparatus, an impedance matching device connected to said transmission line, a device for connecting said impedance matching device to said rotatable propeller, and means for electrically insulating said propeller from said aircraft, said propeller serving as a driven antenna for said apparatus.

5. The combination with an aircraft having a continuously rotating propeller, of radio apparatus carried by said aircraft, and means connected to said propeller and said radio apparatus, said means forming a path for radio-frequency energy and including relatively movable spaced plates forming a capacitance mounted on said aircraft and on said propeller, respectively, said propeller serving as a driven antenna for said radio apparatus.

6. The combination with an aircraft having a continuously rotating propeller, of radio apparatus carried by said aircraft, wires tapped to the respective interior surfaces of a blade of said propeller, a radio frequency conductive coupling between said propeller and aircraft to the rotating part of which said wires are connected; a transmission line connecting said coupling with said radio apparatus, said propeller serving as a driven radio antenna for said apparatus.

7. In an aircraft having a continuously rotating propeller and radio apparatus carried thereby, conductors leading from said apparatus toward said propeller, a radio-frequency conducting coupling having relatively rotatable parts respectively secured to said aircraft and propeller and having one part connected to the propeller end of said conductors, and radio frequency conductors from said other coupling part to said propeller.

8. In an aircraft having a continuously rotating propeller and radio apparatus carried thereby, conductors leading from said apparatus toward said propeller, a radio-frequency conducting coupling having relatively rotatable parts respectively secured to said aircraft and propeller and having one part connected to the propeller end of said conductors, and radio frequency conductors from said other coupling part to said propeller, said coupling being non-conductive to electrical energy at other than radio frequency.

9. In an aircraft having a continuously rotating propeller and radio apparatus carried thereby, conductors leading from said apparatus toward said propeller, a radio-frequency conducting coupling having relatively rotatable parts respectively secured to said aircraft and propeller and having one part connected to the propeller end of said conductors, and radio frequency conductors from said other coupling part to spaced-apart points on a blade of said propeller.

10. In an aircraft having a continuously rotating propeller and radio apparatus carried thereby, conductors leading from said apparatus toward said propeller, a radio-frequency conducting coupling having relatively rotatable parts respectively secured to said aircraft and propeller and having one part connected to the propeller end of said conductors, radio frequency conductors from said other coupling part to spaced-apart points on a blade of said propeller, one of said points comprising a substantially zero-voltage node, spaced from the blade tip, of a selected radio frequency, and the other of said points being spaced from the one point by a distance to secure an impedance between said points which along with the impedance of said coupling and conductors, substantially matches the impedance of the antenna circuit of said apparatus.

ARTHUR E. WILDE, JR.

REFERENCES CITED

The following references are of record in the file of this patent:

UNITED STATES PATENTS

| Number | Name | Date |
|---|---|---|
| 1,532,388 | Dowsett | Apr. 7, 1925 |
| 1,981,884 | Taylor | Nov. 27, 1934 |
| 2,093,217 | Stout et al. | Sept. 14, 1937 |
| 2,129,852 | Leib | Sept. 13, 1938 |
| 2,159,379 | Hyland | May 23, 1939 |
| 2,235,139 | Bruce | Mar. 18, 1941 |
| 2,279,130 | Bruce | Apr. 7, 1942 |
| 2,347,282 | Roby | Apr. 25, 1944 |
| 2,426,226 | Labin | Aug. 26, 1947 |
| 2,431,124 | Kees | Nov. 18, 1947 |

FOREIGN PATENTS

| Number | Country | Date |
|---|---|---|
| 486,084 | Great Britain | May 25, 1938 |
| 541,600 | Great Britain | Dec. 3, 1941 |
| 550,716 | Great Britain | Jan. 21, 1943 |